US008781909B2

(12) United States Patent
Sanamrad (10) Patent No.: US 8,781,909 B2
(45) Date of Patent: Jul. 15, 2014

(54) METHOD, MEDIUM, AND SYSTEM FOR ENSURING THE QUALITY OF A SERVICE IN A DISTRIBUTED COMPUTING ENVIRONMENT (75) Inventor: Mohammad Ali Sanamrad, Lidingö (SE)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 11/575,225

(22) PCT Filed: Nov. 9, 2005

(86) PCT No.: PCT/EP2005/055857
§ 371 (c)(1),
(2), (4) Date: Mar. 14, 2007

(87) PCT Pub. No.: WO2006/056534
PCT Pub. Date: Jun. 1, 2006

(65) Prior Publication Data
US 2008/0065402 A1 Mar. 13, 2008

(30) Foreign Application Priority Data
Nov. 25, 2004 (GB) .................................. 0425860.4

(51) Int. Cl.
*G06Q 30/00* (2012.01)
(52) U.S. Cl.
USPC ........................................ 705/26.1; 705/7.41
(58) Field of Classification Search
USPC ........ 705/26, 27, 26.1, 27.1, 7.13, 7.14, 7.41, 705/7.42
See application file for complete search history.

(56) References Cited

U.S. PATENT DOCUMENTS

| 5,129,077 A | 7/1992 | Hillis |
| 5,317,726 A | 5/1994 | Horst |
| 6,161,099 A | 12/2000 | Harrington et al. |
| 6,363,453 B1 | 3/2002 | Esposito et al. |

(Continued)

FOREIGN PATENT DOCUMENTS

| JP | 2001282760 A | 10/2001 |
| JP | 2002223211 A | 8/2002 |

(Continued)

OTHER PUBLICATIONS

Shuping Ran. 2003. A model for web services discovery with QoS. SIGecom Exch. 4, 1 (Mar. 2003), 1-10.*

(Continued)

*Primary Examiner* — Matthew Zimmerman
(74) *Attorney, Agent, or Firm* — Schmeiser, Olsen & Watts, LLP; John Pivnichny (57) ABSTRACT

A method of determining a service provider to perform a service. A request for the service and requirements pertaining to performance of the service is received. Identification of providers of service capable of performing the service in conformity with the requirements is received. The request and the requirements are broadcasted to the providers of service. An indication of willingness, by service providers selected from the providers of service, to perform the service in conformity with the requirements is received. An indication of performance of the service by each service provider and statistical data indicative of an extent to which performance of the service by each service provider matches each requirement are received. A preferred service provider is ascertained from analysis of the statistical data, based on performance of the service by the preferred service provider most closely matching the requirements. An identification of the preferred service provider is stored.

20 Claims, 5 Drawing Sheets (56) References Cited

U.S. PATENT DOCUMENTS

| | | | |
|---|---|---|---|
| 7,155,400 B1 * | 12/2006 | Jilk et al. | 705/7.14 |
| 7,159,007 B2 | 1/2007 | Stawikowski | |
| 7,254,645 B2 | 8/2007 | Nishi | |
| 7,330,826 B1 * | 2/2008 | Porat et al. | 705/26 |
| 7,340,508 B1 | 3/2008 | Kasi et al. | |
| 7,461,166 B2 | 12/2008 | Doyle et al. | |
| 2002/0186875 A1 | 12/2002 | Burmer et al. | |
| 2003/0037045 A1 | 2/2003 | Melhado | |
| 2006/0106675 A1 * | 5/2006 | Cohen et al. | 705/26 |

FOREIGN PATENT DOCUMENTS

| | | |
|---|---|---|
| JP | 2004199300 A | 7/2004 |
| JP | 2004252975 A | 9/2004 |
| TW | I220198 | 8/2004 |
| WO | 2004027548 A2 | 4/2004 |

OTHER PUBLICATIONS

Hongan Chen et al: "QCWS: an implementation of QoS-capable multimedia web services", Multimedia Software Engineering, 2003. Proceedings. Fifth International Symposium on Dec. 10-12, 2003, Piscataway, NJ, USA, IEEE, Dec. 10, 2003, pp. 38-45, XP010674444; ISBN: 0-7695-2031-6, the whole document.

Al-Ali R J et al: "Supporting QoS-based discovery in service-oriented grids", Parallel and Distributed Processing Symposium, 2003. Proceedings. International Apr. 22-26, 2003, Piscataway, NJ, USA, IEEE, Apr. 22, 2003, pp. 101-109, XP010645637; ISBN: 0-7695-1926-1, the whole document.

M. Searles, P. Perry and L. Murphy: "Probe based dynamic server selection for multimedia QoS", Proc. Het-Nets '03—First Int. Working Conference on Performance Modelling and Evaluation of Heterogeneous Networks, Jul. 21, 2003, XP002372372, Ilkley, England, the whole document.

Liu Yutu et al: "QoS computation and policing in dynamic web service selection" Thirteenth Int. World Wide Web Conf. Proc. WWW; Thirteenth International World Wide Web Conference Proceedings, WWW2004; Thirteenth International World Wide Web Conference Proceedings, WWW2004 2004, May 17, 2004, pp. 63-73, XP002372373, the whole document.

* cited by examiner

METHOD, MEDIUM, AND SYSTEM FOR ENSURING THE QUALITY OF A SERVICE IN A DISTRIBUTED COMPUTING ENVIRONMENT

FIELD OF THE INVENTION

The present invention relates to a method, a system, and a computer program product for ensuring the quality of a service in a distributed computing environment.

BACKGROUND OF THE INVENTION

E-business continues to be a rapidly evolving area of information technology. Typical e-business transactions include the buying and selling of goods over a computer network, such as the Internet. In general, business entities tend to conduct transactions across the Internet with heterogeneous systems, applications, databases, and communication technologies. These Internet type e-business transactions have typically been defined, by person-to-program interactions. For example, such interactions allow individuals to access programs on network browsers. While these networking systems have been revolutionary in many respects, such networking systems nevertheless present several limitations.

In this regard, web services are emerging as tools for use on the Internet for creating next generation distributed data processing systems. Essentially, web services involve business and consumer applications that enable heterogeneous computer systems to communicate seamlessly over a network; especially in a manner whereby cross platform application integration occurs. Such web services typically rely on standard technology, such as XML and Simple Object Access Protocol (SOAP). Messages between web service requesters and providers are communicated in an XML format and conducted through with the network-neutral SOAP over an HTTP connection. As a result, web services provide an approach for unifying integration of a wide variety of computers and software that are involved in e-business. Use of this approach facilitates program-to-program interactions without requiring user-to-program interactions and this presents, of course, significant advantages.

In a typical web services business transaction, a service requester application queries a web services registry by specifying functions and seeking a registered provider of such services. The web services providers typically publish (e.g., advertise) the services they are making available with a standard encoding called Web Services Description Language (WSDL). The web services requester retrieves the stored information from the registry, including how to connect to the web services provider. Then once a selection occurs, a requester's application and a provider's application communicate for establishing a business transaction.

However, it is often the case that once a business transaction has been established, i.e. a requester has contracted with a provider for a service that matches the requesters needs, quality of service requirements are often not taken into consideration and the requester is often disappointed with the results. The above mentioned problem is not just limited to web services, in a grid computing environment it often the case that quality of service requirements are often not taken into consideration when processing services etc.

Therefore there is a need within the prior art for the above-forementioned problems to be alleviated.

DISCLOSURE OF THE INVENTION

Viewed from a first aspect, the present invention provides a method for ensuring the quality of a service within a distributed computing environment, the distributed computing environment comprising a plurality of requesters and providers, the method comprising the steps of: broadcasting a request for a service, the request comprising a quality of service requirement, for receiving by a broker, the broker in dependence of receiving the quality of service requirement, identifying a plurality of participating providers; receiving from the plurality of participating providers, the requested service and metadata comprising an operational parameter pertaining to the requested service; analyzing the metadata and the quality of service requirement of the requested service to identify a participating provider performing the requested service to the quality of service requirement.

Advantageously, the present invention allows a requester to specify a number of quality of service parameters detailing the parameters a requested service should adhere to. For example, a quality of service parameter may state that a requested service should be performed within two hours and the accuracy of the data should not be less than ninety percent. A request for a service is transmitted to a registry for identifying a number of providers who are able to provide the requested service and to the requested quality of service parameters.

Preferably, the present invention provides a method wherein on identifying a participating provider, the requester binds with the participating provider.

Preferably, the present invention provides a method wherein on identifying a plurality participating providers, the requester binds with the plurality of participating providers.

Preferably, the present invention provides a method wherein on receiving the requested service to the quality of service requirement, the requester forms a binding contract with the participating provider.

Preferably, the present invention provides a method wherein the quality of service requirement comprises a plurality of operational parameters.

Preferably, the present invention provides a method wherein each operational parameter comprises a weighting determining a priority order.

Preferably, the present invention provides a method wherein the step of comparing further comprises analyzing using a rules engine to determine a closest match between the metadata and the quality of service requirement.

Preferably, the present invention provides a method wherein on identification of a participating provider performing the service to a quality of service requirement, the requester forms a binding contract with the participating provider.

Viewed from a second aspect the present invention provides a method of matching providers to requesters in a distributed computing environment, the distributed computing environment comprising a plurality of requesters and providers, the method comprising the steps of: broadcasting a request for a service, the request comprising a quality of service requirement, for receiving by a registry component for determining a plurality of participating providers; receiving from the plurality of participating providers, the requested service and metadata comprising an operational parameter of the requested service; and comparing the metadata with the quality of service requirement of the requested service and identifying a provider which performed the requested service to the quality of service requirement.

Preferably, the present invention provides a broker for ensuring quality of service within a distributed computing environment, the distributed computing environment comprising a plurality of requesters and providers, the system comprising: a broadcast component for broadcasting a request for a service, the request comprising a quality of service requirement, for receiving by a registry component for determining a plurality of participating providers; a receiver for receiving from the plurality of participating providers, the requested service and metadata comprising an operational parameter of the requested service; a comparator for comparing the metadata with the quality of service requirement of the requested service and an identifier for identifying a provider which performed the requested service to the quality of service requirement.

Preferably, the present invention provides a broker wherein on identifying a provider; a binding component forms a contract between the requestor and the identified provider.

Preferably, the present invention provides a broker wherein on identifying a provider, a binding component forms a contract between the requestor and a plurality of identified providers.

Preferably, the present invention provides a broker wherein the quality of service requirement comprises a plurality of operational parameters.

Preferably, the present invention provides a broker wherein each operational parameter comprises a weighting determining a priority order.

Preferably, the present invention provides a broker wherein the comparator component comprises analyzing the metadata to determine, using a nearest neighbor mathematical algorithm, the closest match between the metadata and the quality of service requirement.

Viewed from a third aspect, the present invention provides a system for ensuring quality of service within a distributed computing system, the distributed environment comprising a plurality of requesters and providers, the system comprising: a broker for receiving a request for a service from a plurality of requesters, each request comprising a quality of service requirement; performing a lookup in a directory, to identify a provider registering a service matching the received request and within the quality of service requirement.

Viewed from a fourth aspect, the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
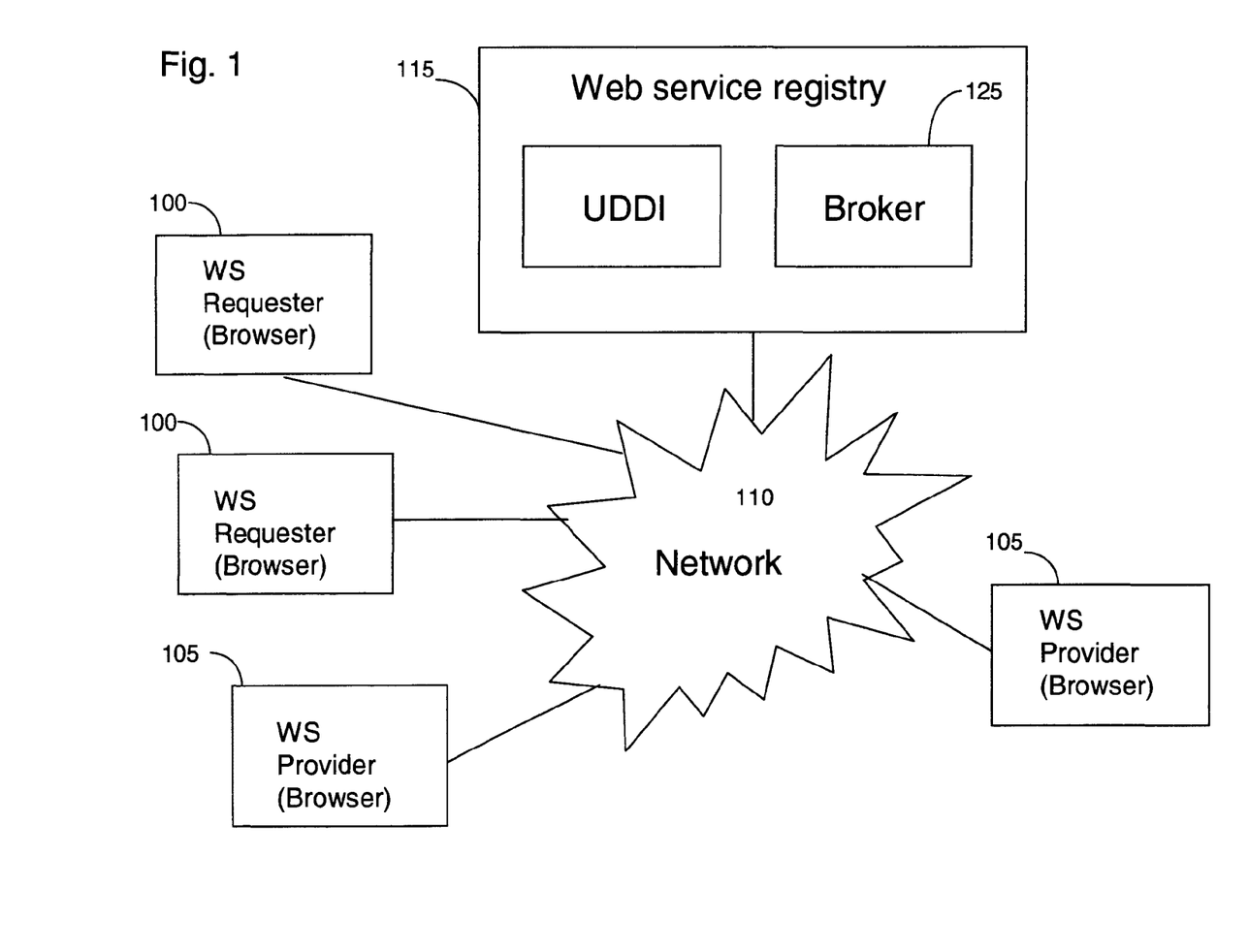
FIG. 1 is a graphical representation of a web services computer network embodying the principles of the present invention.

FIG. 1 illustrates an embodiment of a heterogeneous networked computing environment comprising one or more web services providers 105 and one or more web services requesters 100 that are linked by bi-directional communication lines to a network 110 of coupled web service providers 105 and web service requesters 100. Although, the network 110 is, preferably, the Internet, other networks, such as local-area networks, wide-area networks, or wireless networks are contemplated. The network 110 is operable for working with the appropriate network protocols, for example, HTTP. The network 110 is preferably loosely coupled and is designed across modules to reduce the interdependencies across modules or components. Also, while a network as noted is illustrated, it will be appreciated that a stand-alone computer system to which the web service requesters 105 and web service providers 100 are tightly coupled is also envisioned.

In a web services environment, web service providers 105 publish their services via a Universal Description, Discovery and Integration (UDDI) web services registry 115. The web services registry 115 is, preferably, a global, public, online directory that provides web service requesters 100 with a uniform way to describe their services and to discover other companies' services. Essentially, the UDDI web services registry 115 contains listings of web service providers 105 and each listing contains categories of web services provided by each web service provider 105. The UDDI registry 115 provides an XML interface for allowing a web services requester 100 access to the shared directory and allows publishing of the services of the web services providers 105. As known, the web services registry 115 uses an application that allows creation of web pages for allowing web service requesters 100 to define the several attributes of the request that are inputted. The web services registry 115 further comprises a web service broker 125 for matching the quality of service requirements broadcasted from the web services providers 105.

While a web services type environment is preferred, other systems for linking service resources on demand are contemplated. These attributes relate to the kinds of goods and services, information, etc. which the web services requester 100 desires and, of course, is usable in the system. For example, the web services requester 100 requests information for its specific business applications.

Figure 2:
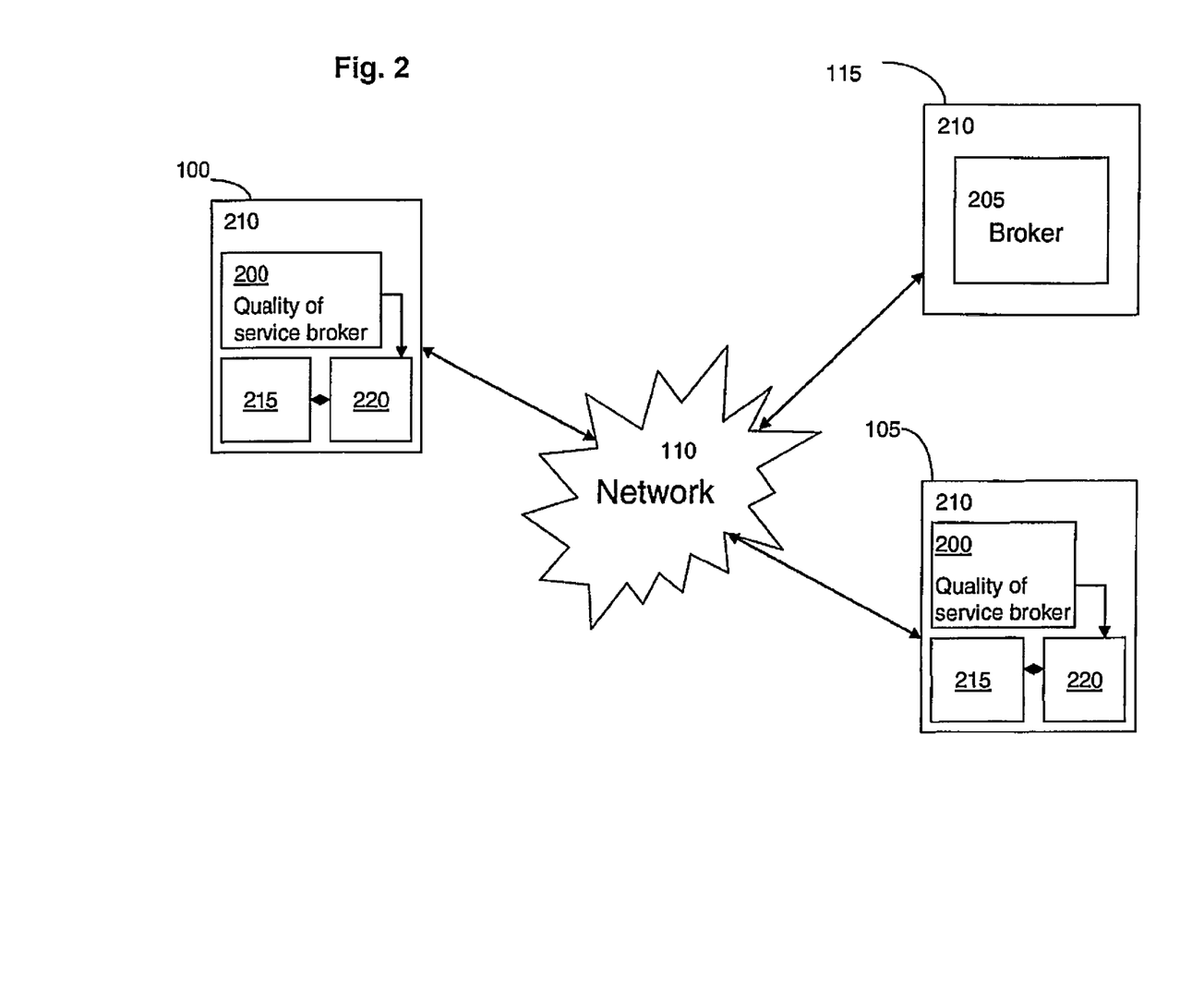
FIG. 2 is a schematic representation of the quality of service broker according to the present invention.

Referring to FIG. 2, there is illustrated one of many preferred embodiments of a networked computer environment that can be used by a web service requesters 100 and web service providers 105. Each web service provider 105 and web service requester 100 is operable for use with a computer system 210. The web services registry 115 comprises a web services broker 205 which corresponds to the web service broker 125 of FIG. 1. The computer system 210 may be any type of computer or other programmable electronic device including a client computer, a server computer or mobile devices etc.

Each computer system 210 comprises a number of application programs, a web services requester application 215, a browser 220 and a quality of service broker 200. The web services requester application 215 is operable for generating Simple Object Access Protocol (SOAP) requests and transmitting them to web services providers 105 either directly or to other web services providers 105 through a web services registry 115. SOAP is a set of rules that facilitate the XML exchange between the one or more applications of the web services requesters 100 and one or more web service providers 105. Each computer system 210 comprises a processor and a computer readable memory unit coupled to the processor, said memory unit containing software code that when executed by the processor implements the methods and algorithms of the present invention described herein. A computer program product comprises a computer usable medium (e.g., the computer readable memory unit) having the software code embodied therein, said computer software code containing instructions that when executed by the processor of the computer system 210 implement the methods and algorithms of the present invention described herein.

The web service requester 100 receives and interprets the responses from the web service provider 105, as will be described. Also, the web service requester application 215 can be a plug-in type for legacy applications. Such legacy applications would be converted to a web services environment by adding functions to handle SOAP and WSDL. In another preferred embodiment, the browser 220 could be used in a client-server embodiment, wherein the browser 220 would interact with the web services requester application 215 on an application server. Each computer system 210 communicates with each other computer systems over a network 110, as previously explained.

As will be explained, a quality of service broker 200 is located on each computer system 210 pertaining to the web service providers 105 and requesters 100. The quality of service broker 200 provides an interface for entering a number of quality of service requirements which pertain to a requested service. The components of the quality of service broker 200 will be explained with reference to FIG. 3.

Figure 3:
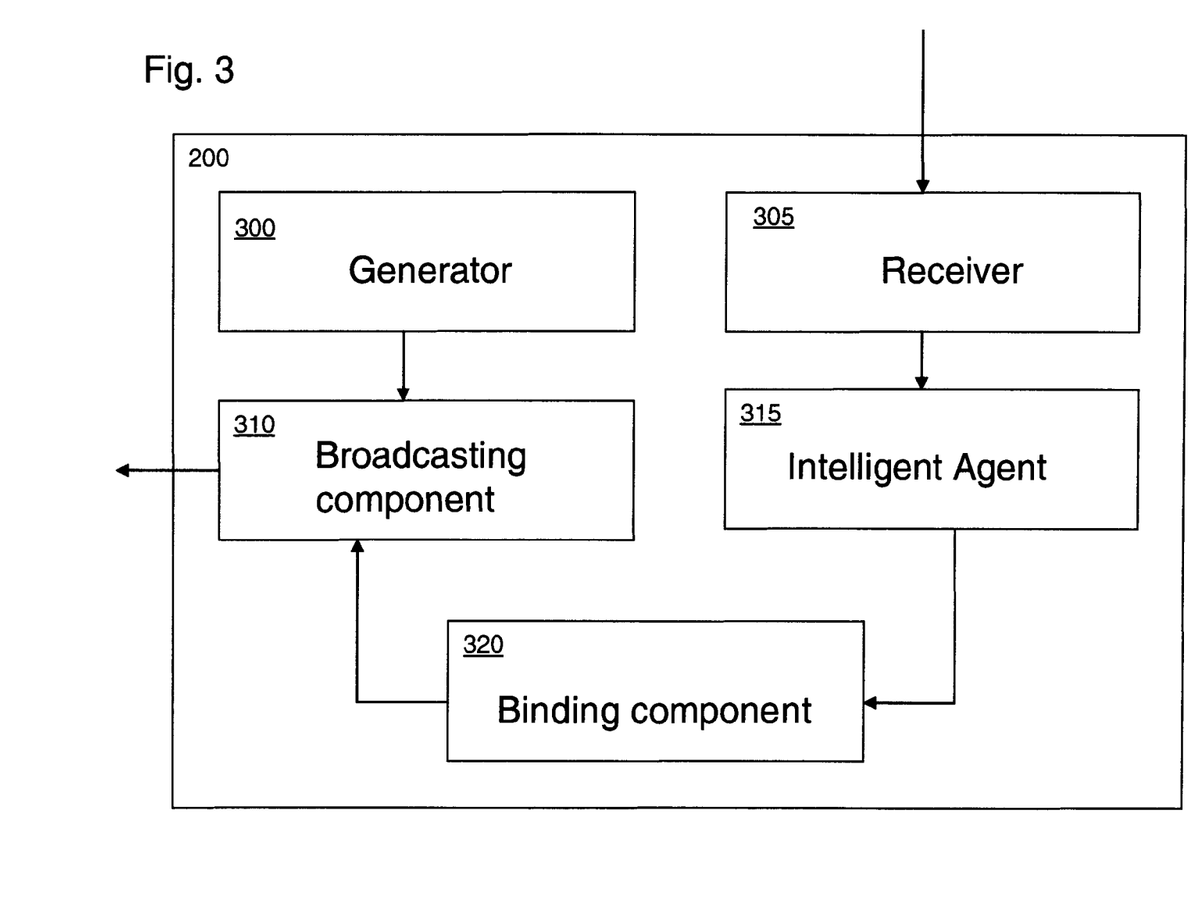
FIG. 3 is a component diagram detailing the components of the quality of service broker.

FIG. 3 shows a quality of service broker 200 which is operable for cooperating with the web browser 220 for sending and receiving requests. The quality of service broker 200 is operable for establishing quality of service requirements for a requested service, identifying a plurality of service providers 105 willing to compete for the service within the identified quality of service requirements and in response to each of the web service providers 105 delivering the requested service; the web service requester 100 selecting the preferred service. On selection of the preferred service provider 105 the requestor may contract with the preferred service provider 105 for further services.

The quality of service broker 200 comprises one or more components that modify and extends the functionality of the web service requester application 215. The components comprise a generator component 300 comprising an interface for receiving one of more quality of service parameters as specified by the web service requester 100, a broadcast component 310 for broadcasting the request for a service along with the quality of service requirements to a number of web service providers 105, a receiver component 305 for receiving the performed service and statistical data relating to the quality of service requirements, an intelligent agent 315 for determining which service provider has performed the requested service within the requested quality of service requirements and a binding component 320 for binding with one of the web service providers 105 who's service is determined as complying, or is determined as closely complying, within the quality of service parameter.

In order to request that a service is performed within certain quality of service requirements, firstly, a web service requestor 100 must identify to the service providers 105 under what criteria they will be willing to contract to. For example, for a particular request, a web services requestor 100 may determine that the request should preferably be completed within a specified time limit, therefore the web service requestor 100 may broadcast these requirements to the web service providers 105 in order for the web service providers 105 to carryout the work within the designated time period. It is not until the work has been returned from all of the web service providers 105 that the web services requestors 100 contract with the most preferred web service provider 105. Alternatively, the web service requestor 100 many contract with the web service provider 105 who returns the performed service to the web service requestor 100 within the quickest time period.

A quality of service requirement may comprise one or more of the following parameters:
- the length of time taken to complete the service taking into account server latency, unreliability of the HTTP transport mechanism
- accuracy of the completed service
- cost of the completed service
- security of the requestor's data whilst the data is being processed
- type of service being performed
- whether the service is being performed by a particular service provider or sub contracted to other service providers
- accessibility of the service Any number of the above parameters may be specified by the web services requester 100 and thus, comprising a combination of parameters that a web service requestor 100 wishes their service to be performed within by a web service provider 105. Each parameter may comprise a weighting; each weighting giving a higher or lower priority to a parameter. These weightings may be selected by the web service requestor 100 at the time of communicating their request to the web service registry 115. The weightings may determine the order of importance of the parameters to the web service requester. An example is as follows:

| Quality of service parameter | Weighting |
|---|---|
| Length of time to complete requested service | 3 |
| Accuracy of completed service | 2 |
| Cost of the completed service | 1 |
| Security of the requestors data | 4 |
| Type of service being performed | 6 |
| Accessibility of the service | 5 |

As is shown the table above, each of the quality of service parameters are assigned a weighting. In this example, a numerical value of 1 signifies a higher value than the numerical value of 2, but it will be appreciated by a person skilled in the art that other values may be used to represent a higher or lower value.

Referring to the table above, each of the parameters is assigned a priority weighting from 1 to 6. This signifies to the web service broker 115, which parameters are of higher importance to the web service requestor 100. In summary, the quality of service requirements in the table above comprises at least one service quality requirement selected from the group consisting of: a length of time requirement comprising a requirement to perform the service within a specified length of time, an accuracy requirement comprising a requirement to perform the service in conformity with a specified accuracy, a cost requirement comprising a requirement to perform the service within a specified cost, a security requirement comprising a requirement to perform the service in conformity with a specified security level, a service type requirement comprising a requirement to perform the service as a specified type of service, an accessibility requirement comprising a requirement to make the service accessible to the requester in accordance with a specified accessibility standard as the service is being performed, and combinations thereof.

Preferably, the web services broker 115 will match a web service provider 105, who can perform the service conforming within the specified parameters and within the priority weights assigned.

There may be more than one web services provider 105 which matches (i.e., satisfies) the parameters requested by the web services requestor 100. If this is the case, the web services broker 115 will broadcast the parameters to all of the identified web service providers 105. Alternatively, the web service broker 115 may match the web service providers to the requested parameters by the highest priority order only.

In order for requesters 100 and service providers 105 to successfully communicate quality of service requirements, it is advisable that a standard representation and notation is developed for describing the quality of service parameters in a unified format.

In a web services environment a standard notation called WSDL is employed to describe a web service. WSDL service description comprises an abstract definition for a set of operations and messages. In order to create a WSDL service description, the description must conform to the data types of the web services registry 115—which are, business entity, business service, binding template and a tmodel. The business entity provides information about a business and can comprise one or more service providers. The technical and business descriptions for a web service are defined in a business service and its binding template. Each binding template comprises a reference to one or more tModels. A tModel is used to define the technical specification of a service. The WSDL language is modified to incorporate the description of a quality of service requirement for a particular service. For example, within a WSDL service interface document an additional tag may be incorporated to hold a description of the quality of service requirements. An example is as follows:
WSL Service Implementation document

```
<definition......>
    <import............>
    <service = process records>
        <quality of service = service returned 60 minutes>
            <port..........>
        </quality of service>
    </service..........>
</definition..........>
```

WSDL specifies a number of tags; the tags define what parameters a request message should contain. The notation that a WSDL file uses to describe message formats is based on XML Schema. In addition to describing message contents, WSDL may define where the service is available and what communications protocol is used to talk to the service. Using the example above, the requester requests a service whereby a service provider will process a number of records, which is denoted by the <service> tag. Moving on down through the XML schema the quality of service tag <quality of service> specifies the parameter <service returned less then 60 minutes>, meaning that it is of importance that the service is returned to the web service requester 100 within a time frame of less than 60 minutes. Within this tag a web service requester 100 may also specify a priority rating for the quality of service parameter.

Several tools are available to read a WSDL file and generate the code required to produce syntactically correct messages for a web service. These tools are well known in that art and will not be discussed in any detail.

Before the web service requestor 100 publishes (i.e., broadcasts) the request for the service, the web service requestor 100 may also send the data, which the service provider 105 needs in order to perform the service, for example, the data may comprise 200 employee records to be processed. In one embodiment, the data is sent across the network to each service provider 105 in order for each web service provider 105 to perform the requested service. In one embodiment, a link may be sent to each of the web service provider 105 informing them where the data is located and how each service provider may access the data. This data exchange requires security and confidentiality of data, which is provided by WS-Security. WS-Security enables the extension of SOAP to allow the passing of security tokens which securely identify and authenticate entities, ensuring message integrity and message confidentiality. The quality of service broker 200 is able to work with WS-Security specifications as it is the SOAP technology that is modified and not the quality of service broker 200. Further information on WS-Security may be found at www.ibm.com/research.

The web service providers 105 publish their services, including service attributes, by making them available with the WSDL specification. In this embodiment, the provider application uses WSDL for creating files that include: a services interface definition and a services implementation definition. The published service attributes also comprise quality of service requirements. The quality of service requirements are populated to include parameters that the web service provider 100 is able to deliver their service to, for example, within a designated time period. These quality of service parameters may then be matched against the quality of service parameters requested by the web service requestors 100.

On receiving the WSDL specification and the data to be processed from the web services requester 100, the web service broker 115 performs a lookup in a data store to determine a match for the requested service against the quality of service requirements. A query language is used to query the data store to locate a service provider 105 registered as offering the service and matching the quality of service requirements in the order of importance specified by the requester.

On identification of one or more web service providers 105 by the web services broker 115, the web service broker 115 broadcasts the data to each of the identified service providers 105. An identified service provider 105 makes a determination as to whether to participate in order to provide the requested web service. If the web service provider 105 decides to participate, the web service provider 105 receives the information from the web service requester 100 detailing the information to be processed and proceeds to bind with the web service requester 100 in order to provide a technical interface and transmit the requested web service to the web service requester 100. Each participating web service provider 105 binds with the web service requester in order to provide the technical interface for data exchange.

On completion of the service, each web service provider 105 transmits to the requester the completed service, along with statistical data pertaining to the requested quality of service parameters, for receiving by the receiver component 305. For example, if the requested quality of service parameters are 'the requested service should be completed within a designated time period, the cost of the service should not exceed one pound and the accuracy of the data must not be less that ninety eight percent', the statistical data relating to the parameters would comprise, how long the service took to perform, the cost of the service and the accuracy of the data. This is advantageous, as the time, cost and accuracy of the service may vary over a period of time, due to economic variables of the service provider. Further this encourages web service providers to perform services to the highest standard possible within the quality of service parameters as requested by the web services requester.

Once the web services requestor 100 is in receipt of all of the statistical data received from each of the web service providers 105 whom participated in performing the service; the intelligent agent 315 of the web service requestor 100 determines which web services provider 105 to contract with. The intelligent agent 315 determines a preferred service provider, namely the service provider 105 that was able to perform the service which closely matched the requested requirements. The intelligent agent 310 is operable for use with a data matching algorithm, or rules engine for parsing the requested requirements along with the received statistical data in order to find the closest match. The closest match may be determined the priority order in which the web service requestor 100 ranked their requirements (i.e., by most closely matching a contiguous sequence of the highest priorities of the priority order), or alternatively, the first web service provider 105 to return a set of results that match all of the web service requestor's 100 requirements. An identification of the preferred service provider is provided to the requestor 100 by being sent to and/or stored in a computer readable memory unit of the computer system 210 of the requestor 100 and may be accessed by and/or displayed to the requestor 100 on the computer system 210 (e.g., by being displayed on a computer screen, printed, etc.).

On identification of the preferred web service provider 105, the web service requestor 100 may enter into a binding contract, for future performance of the performed service, or a binding contract for further services. It is important to note that the binding of the contract is always performed after selection of the preferred service providers.

The above description describes an example, in which, the web service requester 100 selects and contracts with only one web service provider 115. In another embodiment, the web service requester may select and contract with more than one web service provider 115 and use the processed web service from the more than one web service provider for a number of different purposes. Thus, although, an embodiment is described wherein, a one to one relationship is described between a web service requestor 100 and a web service provider 105, it is also envisaged that there may be a many to many relationship between the web service provider 100 and the performed service as requested by the web service requester 115.

Figure 4:
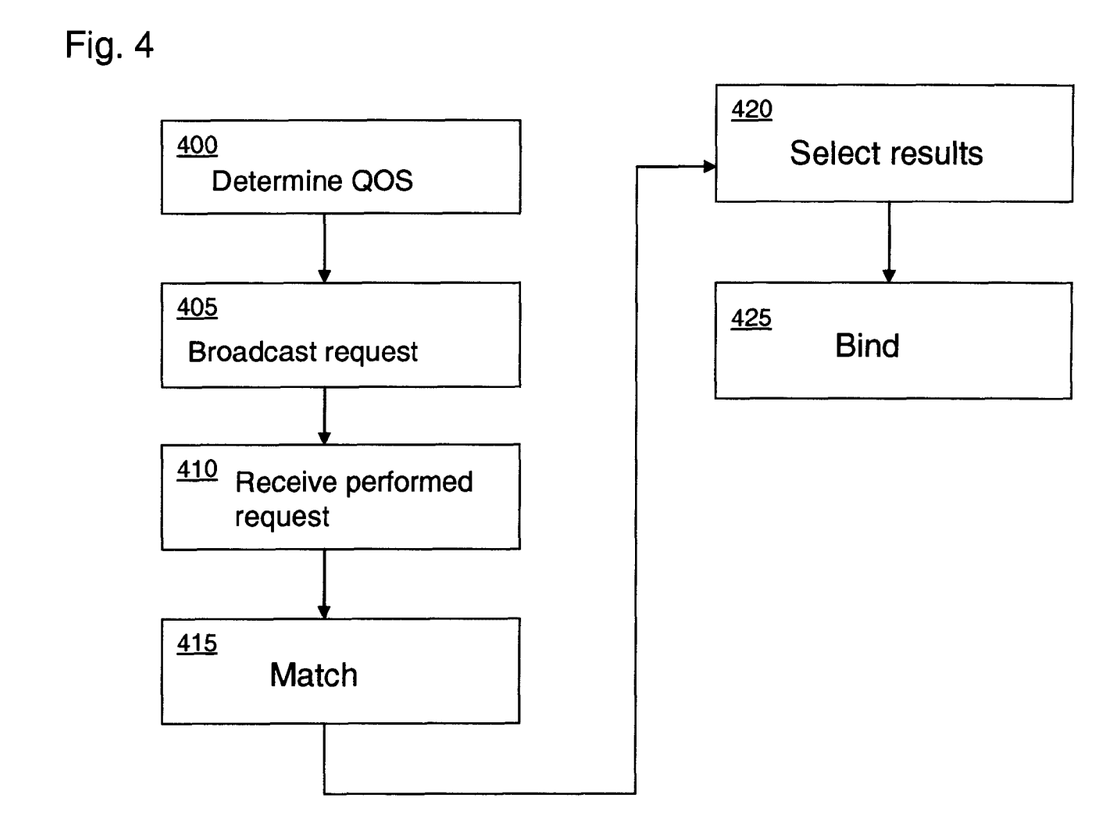
FIG. 4 is a flow chart detailing the operational steps of the quality of service broker.

Moving onto FIG. 4, the operational steps of the web service requestor 100 is shown. At step 400, the web service requestor 100 via the generator component 300 receives one or a number of quality or service parameter(s) for specifying in a WSDL specification. At step 405, the broadcast component 310, broadcasts the WSDL specification to a number or service providers 105 or to a web service broker 115. Once the web service broker 115 has matched the quality of service requirements to one or a number of web service provider(s) 105; the web service providers 105 make a determination as whether to participate and to provide the service. On a positive deteirnination, each participating web service provider 115 proceeds to bind with the web service requestor 100 in order to define the technical interface to allow the exchange of data. On completion of the requested web service, the requested web service is returned to the web service requestor 100 in step 410. The web service provider 105 also returns a set of statistical data detailing performance statistics for the preformed service. At step 415, the intelligent agent 315 parses the received statistical data to match the statistical data against the quality of service parameters to determine which service providers were able to perform the service closest to the requested quality of service requirements.

At step 420, the intelligent agent 315 returns the results and, the best performing i.e. within the specified quality of service requirements, web service provider 105 is selected. Alternatively, more than one web service provider may be selected to contract with and thus, the results of more than performed web service used.

At step 425, the binding component 320 communicates with the selected service provider 105 in order to contract with the selected service provider for either the performed service of for future requested services.

Figure 5:
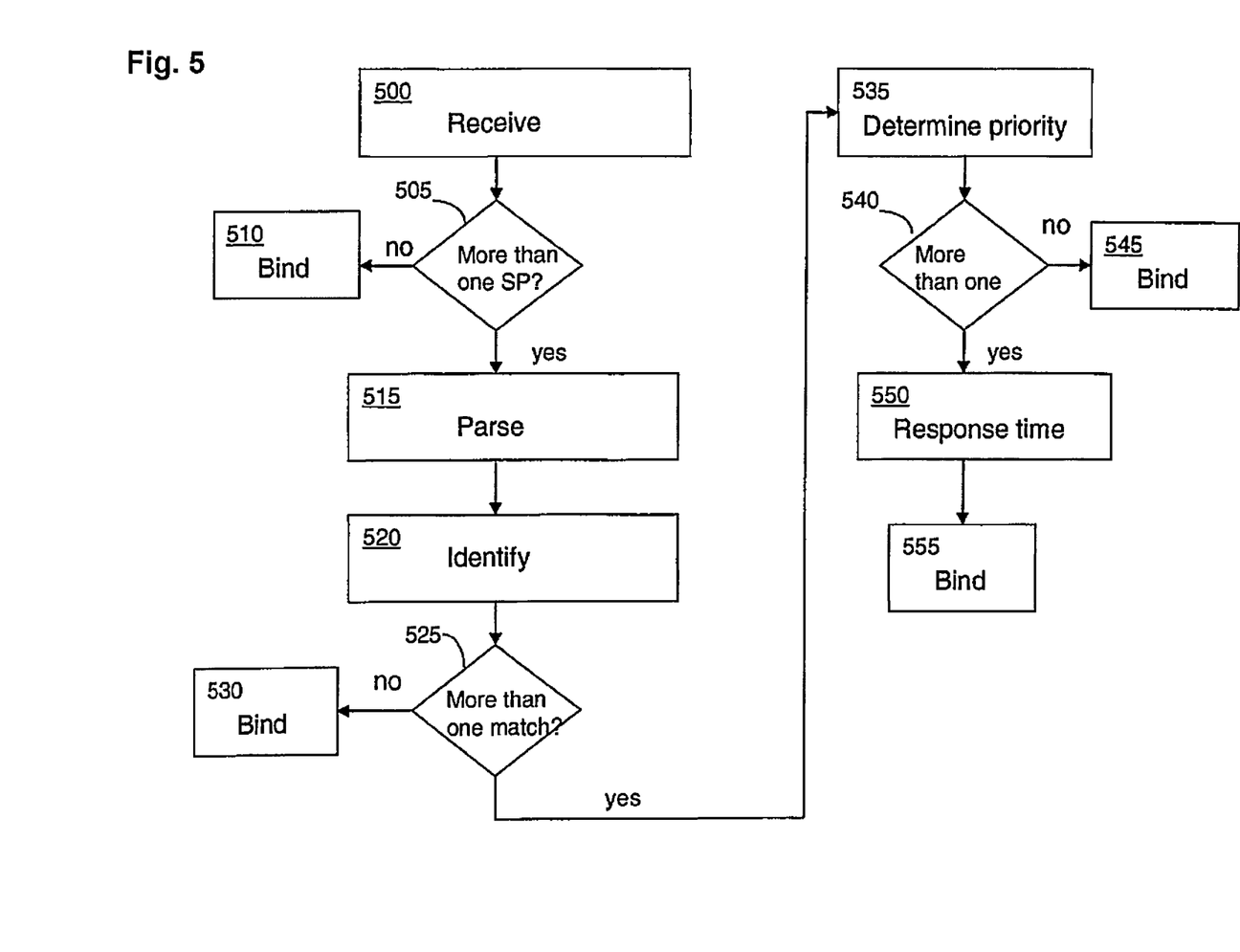
FIG. 5 is a flow chart detailing the operational steps of the binding component of the quality of service broker as shown in FIG. 2.

Moving onto FIG. 5, more detailed operational steps of the binding component 320 are shown. At step 500, the receiver component 305 receives the performed service and the statistical data. Control moves to determination 505 and a determination is made as to whether more than one service provider has returned the performed service. If the determination is negative and only one web service provider 105 has performed the service, the binding component 320 binds with the service provider in step 510. If the determination is positive and more than one web service provider 105 returns the performed service, the intelligent agent 315 begins to parse the statistical data for each web service provider 105 that has returned the performed service at step 515. As the intelligent agent 315 parses the statistical data, the intelligent agent 315 identifies which web service provider 105 has performed the service within the quality of service requirements at step 520. Once identified, control moves to 525 and a determination is made as to whether the intelligent agent 315 has located more than one web service provider 105.

If f the determination is negative and only one web service provider 105 is located, the binding component 320 binds with the located web service provider 105 at step 530. If on the other hand, more than one web service provider 105 is located, the intelligent agent 315 determines whether, the web service requestor wishes to contract with more than one web service provider 105. If the determination is yes, the intelligent agent proceeds to select which web service providers to contract with. In order to determine which web service providers to select, the intelligent agent may select the web service providers that performed the requested service that most closely match the quality of service parameters. Alternatively, the priority order of each of the quality of service requirements as requested by the web service requestor 100, is determined at step 535, as a determiner to which web service providers to select. If the intelligent agent 315 locates more than one service provider (control 540) which matches the priority order, the intelligent agent 315 moves onto step 550 and calculates which web service provider 105 returned the service within the quickest time and thus contracts to the identified service provider in step 555. Alternatively, moving back to control 540, if only one service provider is located that meets the priority order requirements, the binding component contracts with the identified service provider, at step 545.

The invention claimed is:

1. A method of determining a service provider to perform a service, said method comprising:
    a computer system receiving, from a requestor, a request for the service and a plurality of quality of service requirements pertaining to performance of the service;
    after said receiving the request and the plurality of quality of service requirements, said computer system receiving an identification of at least two providers of service who are capable of performing the service in conformity with the plurality of quality of service requirements;
    after said receiving said identification, said computer system broadcasting, to the at least two providers of service, the request and the plurality of quality of service requirements;
    said computer system receiving in response to said broadcasting, from each service provider of a plurality of service providers of the at least two providers of service, an indication of willingness by each service provider to perform the service in conformity with the plurality of quality of service requirements;

after said receiving said indication of willingness from each service provider, said computer system receiving, from each service provider, both an indication of previous performance of the service by each service provider and statistical data indicative of an extent to which said previous performance of the service by each service provider matches each quality of service requirement, wherein the statistical data includes a numerical accuracy of the service;

after said receiving said indication of previous performance and said statistical data from each service provider, ascertaining, by the computer system, a preferred service provider of the plurality of service providers, wherein said ascertaining comprises analyzing the statistical data received from each service provider and concluding from said analyzing that the performance of the service by the preferred service provider is a closer match to the plurality of quality of service requirements than is a match of the performance of the service by each other service provider to the plurality of quality of service requirements, and wherein the service is performed by each service provider after each service provider indicated said willingness and before said ascertaining; and storing an identification of the preferred service provider in a computer-readable storage unit of the computer system.

2. The method of claim 1, wherein the method further comprises: prior to said broadcasting, providing a link to each provider of service, wherein the link enables each provider of service to access data needed by each provider of service to perform the requested service.

3. The method of claim 1, wherein a data store comprises service quality requirements that can be met by specified providers of service of the at least two providers of service, and wherein said determining at least two providers of service comprises:
    said computer system accessing the identification of service quality requirements from the data store; and
    said computer system matching the plurality of quality of service requirements to the accessed service quality requirements to determine the at least two providers of service.

4. The method of claim 1, wherein the closer match is based on the performance of the service by the preferred service provider being accomplished in less time than was accomplished by any other service provider of the plurality of service providers.

5. The method of claim 1, wherein the closer match is based accomplishing a matching of the plurality of quality of service requirements by the preferred service provider via the performance of the service in less time than was accomplished by any other service provider of the plurality of service providers.

6. The method of claim 1,
    wherein the method further comprises said computer system receiving, from the requestor, a relative priority for each quality of service requirement to determine a priority order of the quality of service requirements; and
    wherein the closer match is a function of conformity of the performance of each service provider to the priority order.

7. The method of claim 5, wherein the closer match is based on the performance of the service by the preferred service provider being a closer match to a contiguous sequence of the highest priorities of the priority order than is a match to the priority order of the performance of the service by each other service provider of the plurality of service providers.

8. The method of claim 5, wherein more than one service provider of the plurality of service providers have a same highest conformity of performance to the priority order, resulting in the closer match being based on the performance of the service by the preferred service provider being accomplished sooner than that of any other service provider of the more than one service provider.

9. The method of claim 1, wherein the at least two providers of service consists of the plurality of service providers.

10. The method of claim 1, wherein the at least two providers of service does not consist of the plurality of service providers.

11. The method of claim 1, wherein said receiving identification comprises receiving, by the computer system from a web services registry, said identification of the at least two providers of service.

12. The method of claim 1, wherein the computer system is configured to be operable for use by the requestor.

13. The method of claim 1, wherein the plurality of quality of service requirements comprises at least two different requirements, each different requirement selected from the group consisting of:
    a length of time requirement comprising a requirement to perform the service within a specified length of time,
    an accuracy requirement comprising a requirement to perform the service in conformity with a specified accuracy,
    a cost requirement comprising a requirement to perform the service within a specified cost,
    a security requirement comprising a requirement to perform the service in conformity with a specified security level,
    a service type requirement comprising a requirement to perform the service as a specified type of service, and
    an accessibility requirement comprising a requirement to make the service accessible to the requester in accordance with a specified accessibility standard as the service is being performed.

14. The method of claim 13, wherein each different requirement of the at least two different requirements is selected from the group consisting of the length of time requirement, the accuracy requirement, the cost requirement, the security requirement, the service type requirement, and the accessibility requirement.

15. The method of claim 13, wherein each different requirement of the at least three different requirements is selected from the group consisting of the length of time requirement, the accuracy requirement, the cost requirement, the security requirement, the service type requirement, and the accessibility requirement.

16. The method of claim 13, wherein each different requirement of the at least four different requirements is selected from the group consisting of the length of time requirement, the accuracy requirement, the cost requirement, the security requirement, the service type requirement, and the accessibility requirement.

17. The method of claim 13, wherein each different requirement of the at least five different requirements is selected from the group consisting of the length of time requirement, the accuracy requirement, the cost requirement, the security requirement, the service type requirement, and the accessibility requirement.

18. The method of claim 13, wherein the plurality of service quality requirements consists of the length of time requirement, the accuracy requirement, the cost requirement, the security requirement, the service type requirement, and the accessibility requirement.

19. A distributed computing environment comprising a computer system that comprises:

a processor and a computer readable memory unit coupled to the processor, said memory unit containing software code that when executed by the processor implements a method of determining a service provider to perform a service, said method comprising:

receiving, from a requestor, a request for the service and a plurality of quality of service requirements pertaining to performance of the service;

after said receiving the request and the plurality of quality of service requirements, receiving an identification of at least two providers of service who are capable of performing the service in conformity with the plurality of quality of service requirements;

after said receiving said identification, broadcasting, to the at least two providers of service, the request and the plurality of quality of service requirements;

receiving in response to said broadcasting, from each service provider of a plurality of service providers of the at least two providers of service, an indication of willingness by each service provider to perform the service in conformity with the plurality of quality of service requirements;

after said receiving said indication of willingness from each service provider, receiving, from each service provider, both a completed performance of the service by each service provider and statistical data indicative of an extent to which said completed performance of the service by each service provider matches each quality of service requirement, wherein the statistical data includes a numerical accuracy of the service;

after said receiving said completed performance and said statistical data from each service provider, ascertaining a preferred service provider of the plurality of service providers, wherein said ascertaining comprises analyzing the statistical data received from each service provider and concluding from said analyzing that the completed performance of the service by the preferred service provider is a closer match to the plurality of quality of service requirements than is a match of the completed performance of the service by each other service provider to the plurality of quality of service requirements, and wherein the service is performed by each service provider after each service provider indicated said willingness and before said ascertaining; and storing an identification of the preferred service provider in a computer-readable storage unit of the computer system.

20. A computer program product comprising a computer readable internal memory area of a digital computer having software code embodied therein, said computer software code containing instructions that when executed by a processor of the digital computer implements a method of determining a service provider to perform a service, said method comprising:

receiving, from a requestor, a request for the service and a plurality of quality of service requirements pertaining to performance of the service;

after said receiving the request and the plurality of quality of service requirements, receiving an identification of at least two providers of service who are capable of performing the service in conformity with the plurality of quality of service requirements;

after said receiving said identification, broadcasting, to the at least two providers of service, the request and the plurality of quality of service requirements;

receiving in response to said broadcasting, from each service provider of a plurality of service providers of the at least two providers of service, an indication of willingness by each service provider to perform the service in conformity with the plurality of quality of service requirements;

after said receiving said indication of willingness from each service provider, receiving, from each service provider, both a completed performance of the service by each service provider and statistical data indicative of an extent to which said completed performance of the service by each service provider matches each quality of service requirement, wherein the statistical data includes a numerical accuracy of the service;

after said receiving said completed performance and said statistical data from each service provider, ascertaining a preferred service provider of the plurality of service providers, wherein said ascertaining comprises analyzing the statistical data received from each service provider and concluding from said analyzing that the completed performance of the service by the preferred service provider is a closer match to the plurality of quality of service requirements than is a match of the completed performance of the service by each other service provider to the plurality of quality of service requirements, and wherein the service is performed by each service provider after each service provider indicated said willingness and before said ascertaining; and storing an identification of the preferred service provider in a computer-readable storage unit of the computer system.

* * * * *